Nov. 5, 1968         J. H. BOICEY ET AL       3,409,759
LAMINATED TRANSPARENT PANEL INCORPORATING ELECTRICAL
HEATING WIRES AND METHOD OF PRODUCING SAME
Filed July 21, 1966                                           4 Sheets-Sheet 1
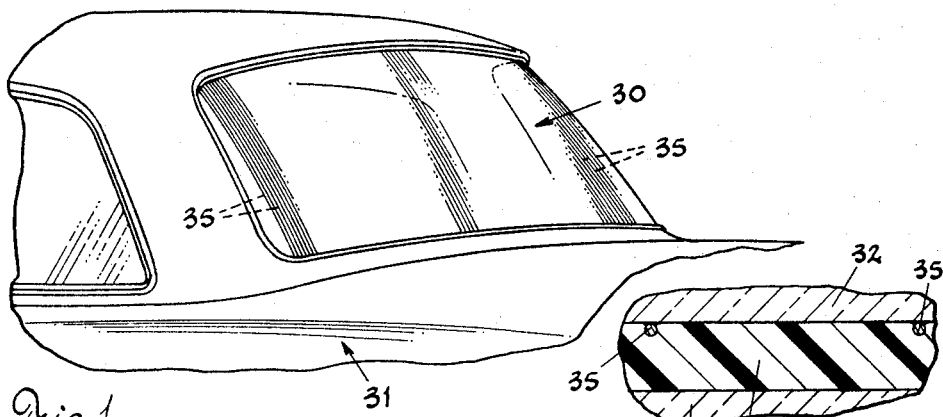
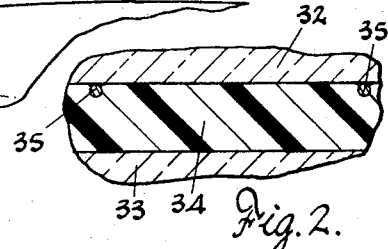
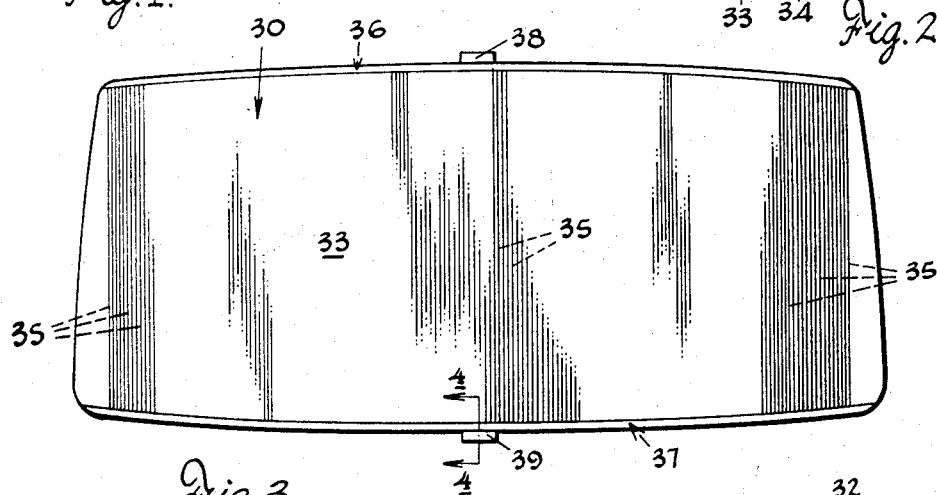
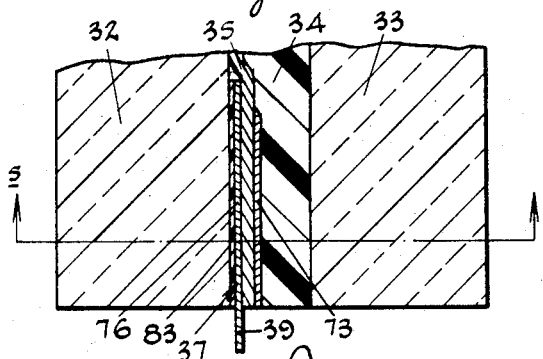
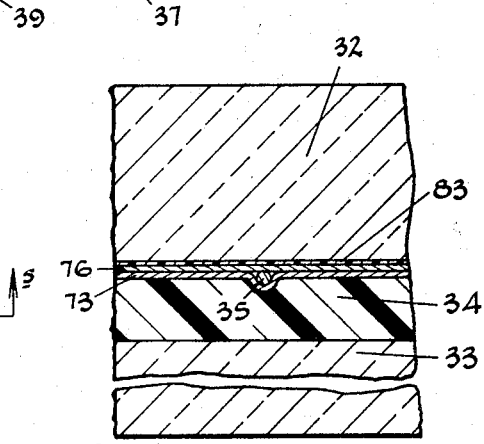
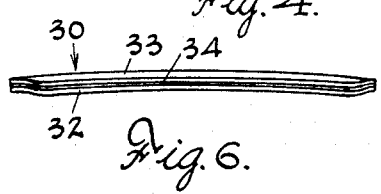
INVENTORS
James H. Boicey and
BY Robert L. Livingston
Nobbe & Swope
ATTORNEYS

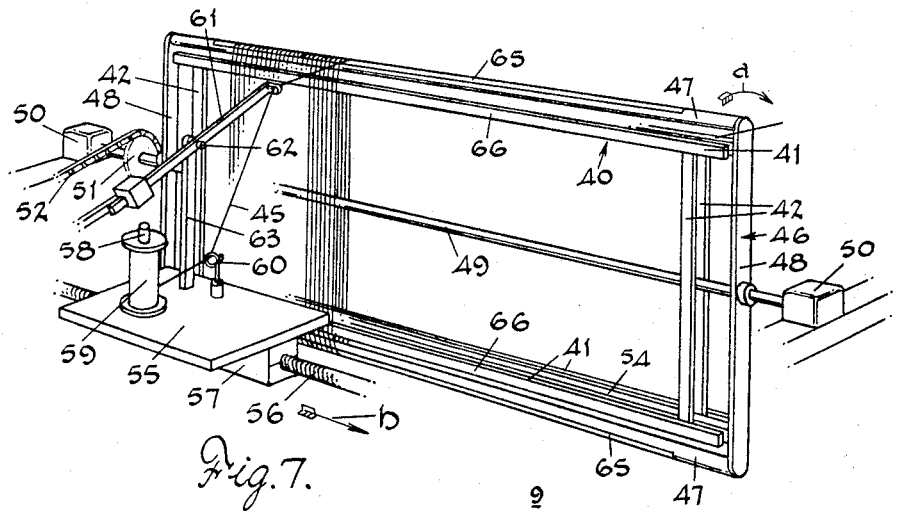
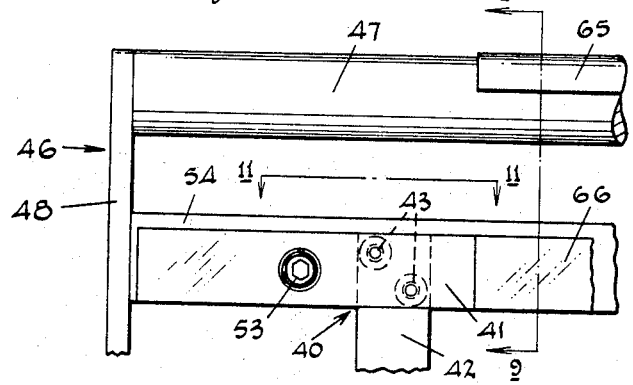
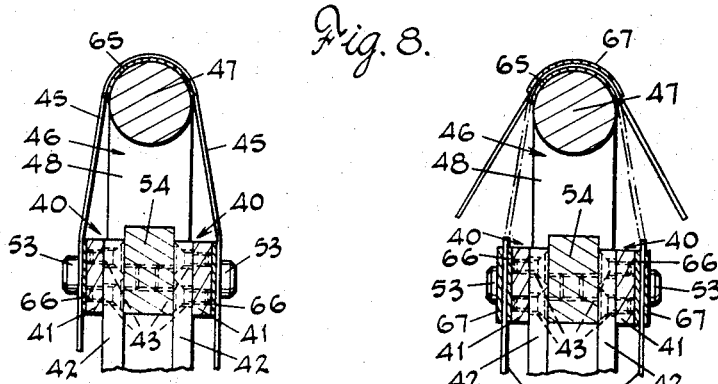
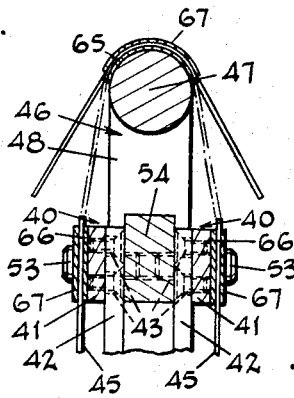
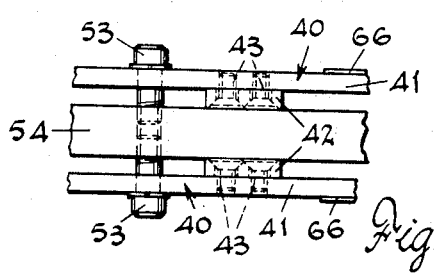

INVENTORS
James H. Boicey and
BY Robert L. Livingston

Nobbe & Swope
ATTORNEYS

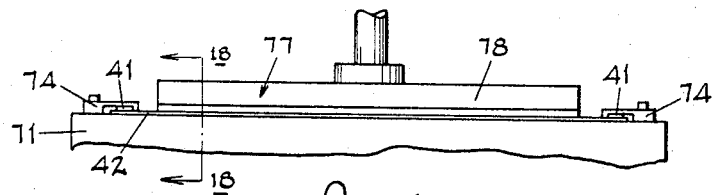
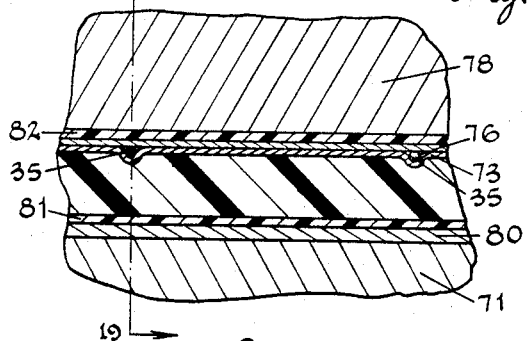
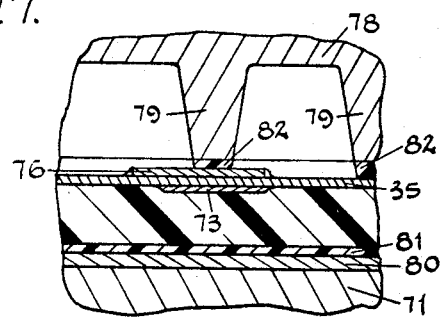
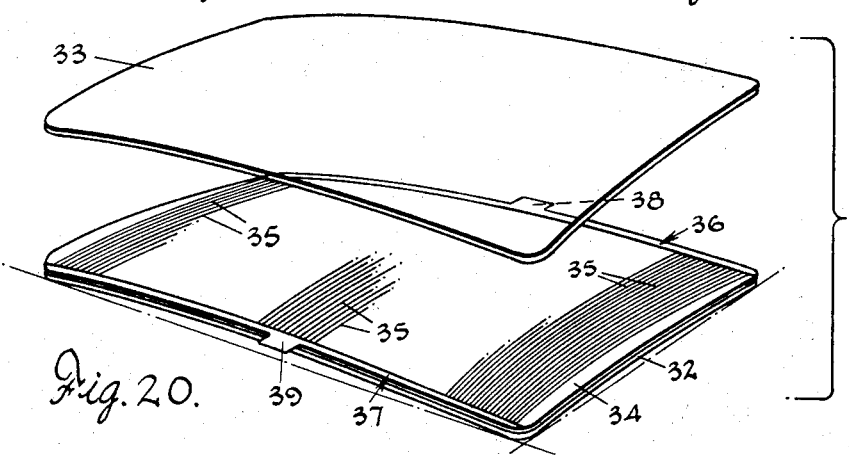
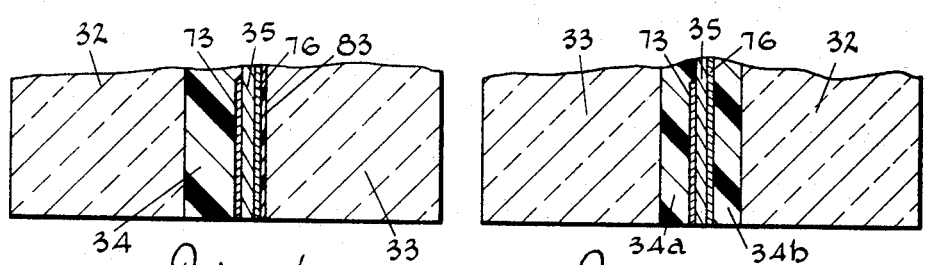

United States Patent Office 3,409,759
Patented Nov. 5, 1968

3,409,759
LAMINATED TRANSPARENT PANEL INCORPORATING ELECTRICAL HEATING WIRES AND METHOD OF PRODUCING SAME
James H. Boicey and Robert L. Livingston, Toledo, Ohio, assignors to Libbey-Owens-Ford Glass Company, Toledo, Ohio, a corporation of Ohio
Filed July 21, 1966, Ser. No. 566,916
12 Claims. (Cl. 219—522)

This invention relates generally to the manufacture of heated glazing units effective to maintain clear vision for the occupants of vehicles, and, more particularly, is concerned with improvements in the construction of transparent panels of the laminated glass type in which electric heating elements are embedded in the laminations in such a manner as to distribute heat uniformly to either principally the outboard sheet if defrosting or deicing is desired, or the inboard sheet if defogging of the glazing is the chief concern.

It has heretofore been suggested to provide electrically heated laminated glazing units by including a grid work of wires between the layers of the laminate, which wires, when electric current is passed therethrough, form resistance heating elements. Various problems, however, have been encountered which make the successful commercial production of such units extremely difficult. For example, it has been found to be very difficult to incorporate the wire strands or grid work in the unit so as to prevent disarrangement thereof during assembly of the glass and plastic of the laminated unit. In particular, serious problems were encountered in providing and maintaining good contact between the bus bars or electrical supply electrodes of the unit and the wire strands. Further, it has been difficult if not impossible to successfully produce a unit of the above type wherein curved glass sheets are employed. In this latter regard, since the wires of the grid work are under tension due to the manner in which the grid work is formed it is difficult to temporarily attach them to a bent glass sheet in the same manner which is the practice in attaching wires to a flat sheet prior to lamination.

It is accordingly, a principal object of the present invention to provide an improved method for producing a heated glazing unit.

Another object of the invention is to provide an improved method of making a laminated glass unit in which conductors of electricity in the form of fine wire strands are so incorporated as to prevent disarrangement thereof during assembly of the glass and plastic of the laminated unit.

A further object of the invention is to provide a novel curved laminated glass unit which is heated by means of a wire grid work integrally incorporated therein.

A still further object of the invention is to provide a heated laminated unit of the above type which incorporates an improved electrode or bus bar structure.

Other objects and advantages of the invention will become more apparent during the course of the following description when taken in connection with the accompanying drawings.

In the drawings, wherein like numerals are employed to designate like parts throughout the same:

FIG. 1 is a fragmentary view in perspective of the roof and trunk panel of an automobile embodying a rear glazing composed of a laminated glass unit in accordance with the invention;

FIG. 2 is an enlarged, fragmentary, horizontal cross-sectional view of the laminated glass unit shown in FIG. 1;

FIG. 3 is an elevational view of the laminated glass unit in accordance with the invention;

FIG. 4 is an enlarged cross-sectional view taken along the line 4—4 in FIG. 3;

FIG. 5 is a broken cross-sectional view taken along the line 5—5 of FIG. 4;

FIG. 6 is a plan view of the laminated glass unit of the invention;

FIG. 7 is a perspective view of an apparatus employed in producing a heating wire grid work to be incorporated in the laminated glass unit in accordance with the invention;

FIG. 8 is a fragmentary side elevational view of a portion of the apparatus illustrated in FIG. 7;

FIG. 9 is a cross-sectional view taken along the line 9—9 of FIG. 8;

FIG. 10 is a cross-sectional view similar to FIG. 9, but illustrating a further step in the production of the heating wire grid work;

FIG. 11 is a plan view looking from the line 11—11 of FIG. 8;

FIG. 17 is a side elevational view of a heated platen employed in a further step in the assembly operation;

FIG. 18 is an enlarged fragmentary cross-sectional view taken along the line 18—18 of FIG. 17;

FIG. 19 is a cross-sectional view taken along the line 19—19 of FIG. 18;

FIG. 20 is a perspective view showing the glass sheet assembly portion of the method of the invention;

FIG. 21 is a cross-sectional view illustrating a glazing in accordance with the invention for use in defogging; and FIG. 22 is a cross-sectional view of a glazing representing a further embodiment of the invention.

Figure 12:
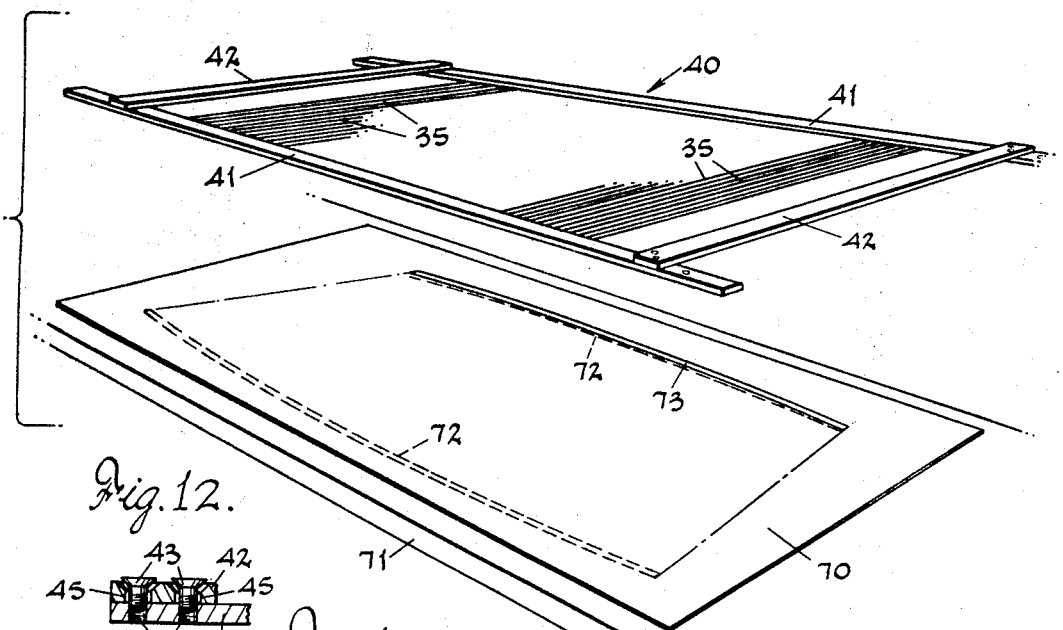
FIG. 12 is a perspective view showing the removable frame portion of the apparatus employed in producing the wire grid work in relation to a sheet of thermoplastic material during a part of the assembly operation in accordance with the invention.

Briefly stated, the heated glazing in accordance with the invention comprises at least two glass sheets bonded together through an interposed transparent sheet of thermoplastic material, a pair of spaced electrodes interposed between one of the glass sheets and the thermoplastic sheet, said electrodes comprising a first layer formed by the air-drying of a suspension of finely divided electrically conducting metal particles in an air-dry binder material adhered directly to the thermoplastic material and a second layer comprised of a thin strip of an electrically conducting metal superimposed upon said first layer, and a plurality of spaced wires extending between said electrodes, said wires being at least partially embedded in said thermoplastic material with the ends of each of the wires being disposed between the first and second electrode layers and in electrical contact therewith. Means to impress an electrical voltage across the electrodes to cause current flow through the wires, e.g. a battery is provided outwardly of the unit.

The invention also contemplates a method of producing a heated, laminated glazing unit including at least a pair of glass sheets bonded together through an interposed transparent sheet of thermoplastic material, comprising the steps of applying to two spaced portions of a thermoplastic sheet bands composed of a suspension of finely divided electrically conducting metal particles in an air-drying binder matrix material, drying this suspension, positioning a gird work comprised of a plurality of spaced, parallel extending wires upon the thermoplastic sheet such that the wires extend between the bands with the opposite ends thereof overlapping and contacting the bands, superimposing upon each of the bands and overlapping wire ends a strip of an electrically conducting metal, which strip is substantially co-extensive with the bands, applying heat to the metal strips to tack same to the electrically conducting air-dried bands therebeneath, applying heat and pressure to a portion of the wires extending between the bands to partially embed and temporarily bond at least the contacted portion of the wires to the thermoplastic sheet, positioning the thermoplastic sheet upon a first glass sheet, laying a second glass sheet upon the other exposed surface of the thermoplastic sheet, and laminating the assembly thus formed under the action of the heat and pressure sufficient to bond the glass and plastic into a composite unit.

Referring now more particularly to the drawings, there is illustrated in FIG. 1 a laminated glass unit 30 constructed in accordance with the invention and shown mounted in its functional position as the rear glazing of an automobile indicated generally at 31. The laminated glass unit includes two sheets of glass 32 and 33 and interposed polyvinyl butyral interlayer 34 bonded to each of the glass sheets (FIG. 2). A plurality of thin wires 35 extend transversely of the laminate and are spaced longitudinally across substantially the entire longitudinal dimension of the glazing. The wires are partially embedded in the polyvinyl butyral resin interlayer and are in electrical contact at their ends with bus bars 36 and 37 extending along both longitudinal marginal edge portions of the unit (FIG. 3).

The bus bars or electrodes 36 and 37 are provided with integral terminal portions 38 and 39, respectively, which are connected by any satisfactory means to the electrical supply system of the automobile. In this manner then, when it is desired to either defog or defrost the laminated glazing, a switch is closed to impress a voltage across the bus bars which, in turn, causes current to flow through the wires 35 and heat to be generated in the glazing due to the resistance of the wires.

Figure 14:
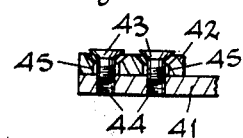
FIG. 14 is a cross-sectional view taken along the line 14—14 of FIG. 13.

In constructing the laminate 30 in accordance with the invention, the heating wire grid work above-described is first prepared. Thus, and referring particularly to FIGS. 7 to 11 and 14, a substantially rectangular frame indicated generally at 40 is provided which comprises longitudinal or side members 41 and transverse or end members 42. The side and end members are joined together by means of slotted flat-head machine screws 43, with drilled and tapped openings 44 being provided in the side members. The screw receiving bores 45 (FIG. 14) in the end members are larger than the screw shanks whereby a small adjustment may be made to vary the distance between the two side and two end members by loosening the screws, this adjustment being desirable for reasons to be hereinafter more fully explained.

The frame 40, preferably together with another identical frame, are affixed on opposite sides of a rotating rack indicated generally at 46. The rack 46 is composed of two spaced longitudinally extending bars 47 welded or otherwise suitably secured at their ends to a pair of end members 48, and a rod 49 also secured to the end members and forming the axis about which the rack rotates. In this connection, the rod 49 is journaled at its ends in bearing blocks 50 located on a support framework and has a sprocket 51 keyed thereto which, through a chain 52, is driven by a motor (not shown) to rotate the bar and the rack in the clockwise direction of the arrow designated by the letter a.

The frames 40 are attached to the rack 46 by four socket head machine screws 53 extending through the side members 41 into threaded engagement with one of a pair of bars 54. The bars 54 extend between and are affixed to the end members 48 of the rack just inside the bars 47.

The heating wires are positioned on the frames 40 by means of the screw-driven assembly illustrated in FIG. 7. In this respect, a platform 55 is driven parallel to the longitudinal axes of the frames and rack 46 in the direction of the arrow designated by the letter b by means of a drive screw 56 and a threaded block 57 affixed to the platform. A spindle 58 extends upwardly from the platform and forms the axis about which a spool 59, containing the desired size of wire to be wrapped about the frame, is free to rotate. The wire 35 is lead from the spool 59 through an eyelet 60 affixed to the platform and then through a guide in a weighted arm 61. The arm 61 is free to pivot on a shaft 62 journaled in the upper end of a support 63 extending upwardly from the platform. As will be readily appreciated, the spacing of the wires longitudinally of the frame may be varied depending upon the number per inch desired in the laminate by correlating the speed of rotation of the rack 46 and speed of movement of the platform 55 along the path.

Prior to wrapping the wire upon the frame, pieces of tape 65 with adhesive on both sides thereof are applied to the outwardly disposed surfaces of the rods 47. This has been found to prevent slippage of the loops of wire longitudinally of the frame during winding. In addition, pieces of an electrical tape 66 are applied to the outwardly facing surfaces of the side members 41 of the frames. Thereafter, upon completion of the winding operation, second strips of tape 67 are applied over the wires and the first strips 65 and 66 to secure the wires in place (FIG. 10). In this respect, it has been found that the backs of the electrical strips 66 provide a better surface for the strips 67 than would the metal side members 41, and it is important that a good bond between these tapes be obtained due to this providing the sole support for the wires upon removal of the frames.

Prior to removing the frames 40 from the rack 46, the heating wires are cut along the outer surface of the longitudinal or side members 41 of the frames substantially flush therewith as shown in FIG. 10. This, of course, actually produces two separate wire grid works with each wire being held in its predetermined position between the members 41 by the tape strips 65 and 67 as aforesaid. The frames are then separated from the rack by removing the screws 53.

It will be appreciated that while the preparation of two heating wire grid works simultaneously has been illustrated herein, three, four or more may be prepared by employing triangular, quadrangular, hexangular, etc. shaped racks or, of course, only one need be prepared at once although this involves an attendant loss of a great amount of wire.

One of the frames and attached heating wire grid work is next carried to an area where a sheet of thermoplastic material, e.g. composed of polyvinyl butyral resin, used to form the interlayer 34 has been cut. As best illustrated in FIG. 12, a block-size sheet 70 of polyvinyl butyral is laid on a flat surface 71 and centered with respect to an outline 72 of the two bus bars 36 and 37 which has been drawn on the surface. A stencil is then employed to paint the polyvinyl butyral sheet within the outline of the bus bars seen therethrough with an air-dry silver paste or suspension to form a portion of the bus bars. In this connection, the electrically conducting paste comprises a large amount of electrically conducting metal particles, e.g. metallic silver flake, suspended in polymerizable polyester resin. A preferred material is an air-dry silver conductive coating available from the Chemical Coatings Division of The Hanna Paint Mfg. Company under the designation "XC–4001." Upon drying and polymerizing of the resin binder, an electrically conducting layer 73 is formed (see FIGS. 4 and 5).

Figure 13:
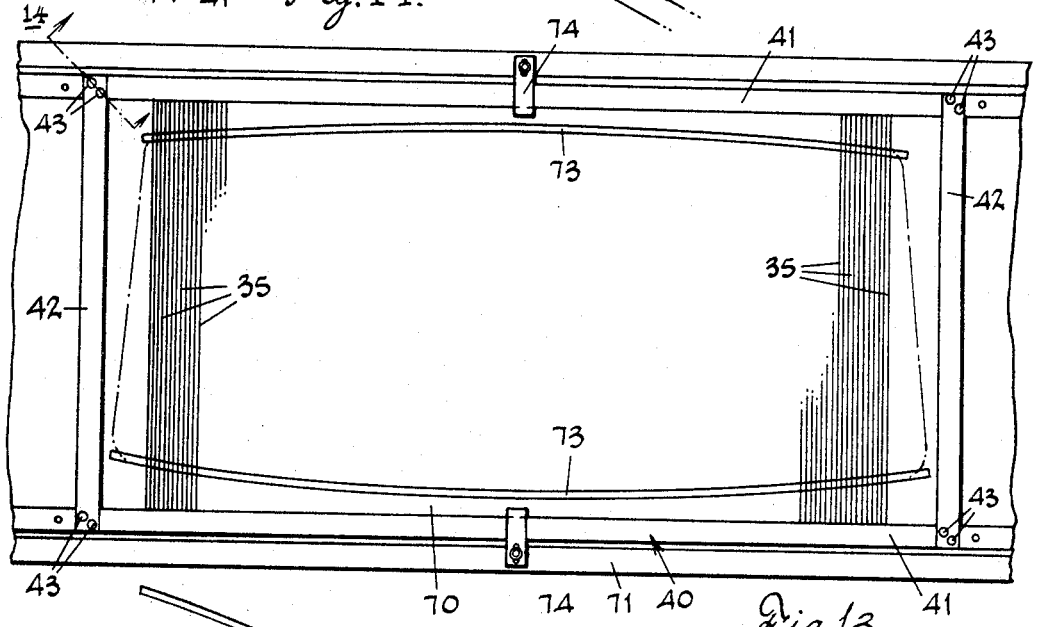
FIG. 13 is a plan view of the frame positioned upon the sheet of thermoplastic material.

Due to the fact that the wires 35 are wrapped on the frames under a slight amount of tension there is a tendency for the side members 41, if composed of very light gauge metal, to be pulled toward each other when the frames are removed from the rack 46. Since such deflection of the side members cannot be tolerated if the wires are to be positioned properly on the plastic, a pair of clamping members 74 are affixed to the surface 71 and are effective to hold the frame side members in substantially parallel relationship (FIGS. 13 and 17). Also, it is possible at this point to lessen the tension of the wires by loosening the screws 43. Thus, this will enable a small adjustment in the distance of the two side members 41 from each other due to the screw receiving bores 45 being larger than the screw shanks as hereinbefore described. This is particularly important where the glass sheets of the unit are to be curved since an undue amount of tension in the wires will be detrimental in subsequent operations.

Figures 15, 16:
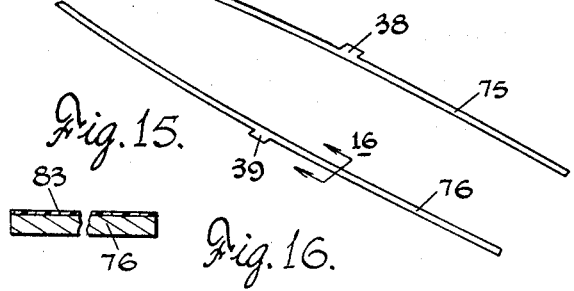
FIG. 15 is a plan view of two electrically conducting metal strips employed in the novel electrode structure in accordance with the invention.
FIG. 16 is an enlarged, broken cross-sectional view taken along the line 16—16 of FIG. 15.

After the frame is clamped in position on top of the plastic sheet 70 with the wire grid side down or such that the wires are in contact with the plastic, thin strips or bands 75 and 76 of an electrically conducting metal, and preferably copper (FIG. 15), of a length and configuration very similar to the bands of air-dry silver, are applied over the latter and the wires. The copper strips, which together with the air-dry silver suspension form the electrode or bus bar structures 36 and 37 in accordance with the invention, are fixed in position for the subsequent laminating operation by applying heat thereto sufficient to adhere the copper to the air-dry silver therebeneath at the portions between the wires. One convenient method of effecting this heating has been the employment of a soldering gun drawn along the length of the copper wire. It has been found to be desirable for the copper strips 75 and 76 to be of slightly greater width than the air-dried silver bands. For example, one preferred structure in accordance with the invention includes ¼ inch wide air-dry silver bands and $5/16$ inch wide copper strips. The copper strips also preferably includes the ear portions 38 and 39 integral therewith, which are used, in accordance with the embodiment shown, as the electrical terminals for the unit. After the copper electrode strips are fixed in position as above described, the wire grid work and polyvinyl butyral plastic sheet within the electrode structures are tacked together so as to enable handling thereof prior to the lamination step without relative movement occurring therebetween. For this purpose, one excellent means has been the heated platen illustrated generally at 77 in FIG. 17 and including a face plate 78, composed of a ribbed surface. Thus, the face plate 78 includes a number of ribs 79 extending longitudinally of the platen as best illustrated in FIG. 19. In this connection, it is not necessary that the wires and plastic be adhered together throughout the entire contacting area prior to lamination, it being sufficient if only approximately ⅓ of such contact area is actually tacked, and accordingly only approximately ⅓ of the area of the face is ribbed. This area preferably includes, however, strips immediately on either side of, and co-extensive with, the combination air-dry silver and copper electrodes 36 and 37. A temperature of approximately 375° F. applied for only about five seconds has been found to be sufficient to tack and slightly embed the wires into a sheet of polyvinyl butyral resin and it is to this temperature the platen is heated. In this respect, it is never necessary to heat the plastic over 180° F. to properly effect the preliminary tacking operation and in fact only enough heat and time at temperature is necessary to soften the surface of the plastic.

As illustrated in FIGS. 18 and 19, the working surface 71 upon which the assembly of plastic sheet, wire grid work and electrodes is positioned for the tacking operation, and which preferably is the same surface upon which the preceding described operations have been performed, includes a resilient backing member 80 and a thin Teflon sheet 81 which is effective to prevent sticking of the polyvinyl butyral plastic to the working surface. In a similar manner, the lowermost surfaces of the ribs 79 of the heated platen 77 have affixed thereto a Teflon strip or coating 82 to prevent sticking at these points when the platen is brought into contact with the plastic and wires.

Upon completion of the tacking operation, a thin polyvinyl butyral film 83 is provided upon the exposed surface of the copper electrode strips 75 and 76. The film, which need be only on the order of .001 to .002 inch in thickness, may suitably be applied by brushing or spraying a solution of polyvinyl butyral, for example, composed of 450 grams of polyvinyl butyral resin in 5 gallons of chloroform, onto the copper and then permitting this to dry in the atmosphere. It is only necessary to employ this coating of polyvinyl butyral where, as in the embodiment shown, the electrodes are positioned at the very edge of the glass sheets of the laminated unit. Thus, it has been found that this layer is necessary with the illustrated embodiment for proper lamination of the glass sheets to each other during the autoclave cycle since there is a possibility of oil penetration between the layers in the absence of this sprayed layer. However, it is not necessary to employ the additional layer in the event the electrodes are set in from the edges of the unit as is sometimes the case. In addition, this sprayed layer is not necessary when the interlayer is a build-up of two or more sheets of polyvinyl butyral as will hereinafter be described.

After the sprayed polyvinyl butyral coating 83 has been provided over the copper strips 75 and 76, the plastic sheet 70 and wires 35 are cut within the periphery of the frame 40, care being taken to assure that the sealed or tacked portions immediately outside of the electrodes remain intact. The frame 40 is then removed and the wire ends or tailings which are still taped to the side members 41 discarded.

The plastic sheet 34 and attached wire network are next positioned and centered upon the glass sheet 32 of the outline and curvature desired for the laminated unit (FIG. 20). In this connection and in the preferred embodiment shown wherein the laminated unit is bent or curved, it is preferred that the polyvinyl butyral plastic be positioned on the convex surface of the glass sheet 32. The glass sheet 32, as noted in the drawing, is the inboard lite or panel of the laminated unit 30 and the convex surface thereof the inboard surface of the panel.

The side of the polyvinyl butyral sheet in contact with the convex surface, i.e. whether the wires or the plastic are in contact with this surface, is dependent upon the service to which the laminate is to be put. Thus, in the event the wire grid is only to effect defogging of the laminate, the plastic sheet 34 is best positioned such that the wires 35 are in contact with the convex surface of the inboard glass sheet 32 as in the embodiment shown in FIGS. 1 to 20. If the unit is to be capable of deicing or defrosting, then the polyvinyl butyral sheet and heating wire network are positioned on the inboard surface of the inboard lite with the plastic or polyvinyl butyral in contact with the convex surface. In this manner, upon positioning the second glass sheet 33 on the inboard sheet, the wires will be in contact with the inboard surface of the outboard sheet. This latter arrangement is illustrated in FIG. 21 wherein the side of the plastic including the heating wire network 35 is adjacent the inboard surface of the outboard sheet 33.

After the second or outboard glass sheet 33, which of course is matched in curvature with the inboard glass sheet 32, is positioned upon the latter, the plastic is trimmed about the peripheral edge of the unit and either pieces of tape applied at spaced points thereabout or the unit spot heated at such points to hold the components in their assembled position until and during delivery to the autoclave. In this respect, and in order to form the actual laminated unit in accordance with the invention, the above-described glass and plastic assembly is inserted into a flexible plastic bag or envelope of airimpervious material, e.g. heat sealable lacquer coated cellophane, and the envelope heat sealed as to be air tight. A small opening is provided in the envelope and a conduit extending from a vacuum pump inserted in the opening. The envelope is then evacuated through the vacuum connection so as to remove substantially all of the air therewithin. As will be appreciated, during the drawing of the vacuum the atmosphere applies pressure evenly to the surface of the bag which in turn transmits this pressure to the glass sheets of the unit.

It has been found that with the assembly as above-described, an evacuation period of about two or four minutes at approximately 28 or 29 inches of mercury column is sufficient to evacuate the envelope. After this evacuation period, the conduit is removed from the opening in the envelope and the opening immediately resealed so that the interior of the envelope is still under vacuum. The bag assembly is next immersed in a tank containing a suitable liquid such as oil which has been preheated to a temperature of approximately 270° F. and the bag supported therein for about 7 minutes. The bag is then removed from the tank, opened and the finished laminate taken out.

FIG. 22 illustrates an embodiment of the invention wherein a plurality of thin sheets 34a and 34b of polyvinyl butyral resin are employed to form the interlayer of the laminated glass unit. In this unit, the electrode structures 36 and 37, composed of the air-dry silver band 73 and the copper strip 76, are applied to the sheet 34a in the same manner as above described when only one sheet of polyvinyl butyral is employed, and one or more additional resin sheets 34b thereafter applied over the sheet 34a and the electrodes until an interlayer of the desired thickness is obtained. As previously mentioned, it is not necessary to employ the polyvinyl butyral coating 83 on the copper strip 76 in this embodiment.

Although not illustrated in the drawings, it has been found to be desirable to crimp the wires of the heating grid work. Thus, it has been determined that such crimping makes the wires less visible to the human eye when viewing objects through the glazing and also reduces distortion and color interference which sometimes occurs when the glazing is heated. The crimping operation may suitably be performed after the grid work has been produced or the wires wrapped about the frame. In this respect, the capability of the frame to be made slightly smaller through the screws 43 is again very advantageous in this regard since the crimping requires a very slight amount of "give" or additional length of wire between the side members 41 of the frame.

It should also be noted that while in the embodiments shown the heating wire grid work occupies substantially the entire viewing area of the glazing, this is not at all essential and many units have been produced wherein only half the viewing area or merely the middle third of the viewing area have had heating wires incorporated therein. This, of course, is dependent upon just how much of the area of the glazing it is desired to maintain clear or free from fog or ice. Normally, it is desirable for the electrodes or bus bars to be located outside of the viewing area due to their presenting a fairly substantial vision obstruction and accordingly the wires do generally extend the entire transverse dimension or from the top to the bottom of the glazing as shown. Along this same line, while the terminal portions 38 and 39 of the bus bars have been shown positioned in approximately the center thereof, these portions may suitably be located at any point along the bus bars depending chiefly upon where it is most convenient to make connection with the leads from the voltage impressing means.

The composition and diameter of the wires 35 as well as the number thereof per inch is dependent to a great extent on the desired use of the laminated unit, i.e. whether it is to be capable of deicing or just defogging, whether it is to be employed on a land vehicle or in an aircraft where outside temperatures of −50° F. are not unusual, and the supply voltage available, e.g. 12 volts or 110 volts. Good results have been obtained in the production of automobile backlights, wherein the primary purpose of the heating wire network was defogging and a 12 volt system was available for supplying the bus bars, with the use of tungsten wires having a diameter of .0008 inch and incorporating 12 wires per inch to heat an overall area of approximately 43 inches by 19.5 inches. While this system is not a highly efficient deicing system, it should be appreciated that after current has been on for a considerable length of time, some deicing will take place and new ice will definitely be prevented from forming. Other systems have employed wires having diameters from .0001 inch to .002 inch and composed of Nichrome as well as tungsten.

It has also been found advantageous in some embodiments to employ sectioned electrodes along either or both the top and bottom of the glazing. Thus, this type of electrode structure is employed where a higher voltage than is necessary to provide the desired total wattage over the entire unit or viewing area with the disclosed one piece top and bottom electrode structure and wires of a certain diameter is the only voltage source available.

As above briefly mentioned, while the invention has been described and illustrated in connection with the manufacture of glazing units for automotive vehicles including two glass sheets, laminated units having three or four glass sheets or hard plastic sheets, for example, of the type employed in aircraft glazings, may be heated in the manner disclosed herein, the wire grid work normally being positioned between the outboard sheet of the unit and the interlayer between this sheet and the next.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. A heated glazing, comprising at least a pair of glass sheets bonded together through an interposed transparent sheet of thermoplastic material, a pair of spaced electrodes interposed between one of said glass sheets and said thermoplastic sheet, said electrodes comprising a first layer formed by the air-drying of a suspension of finely divided electrically conducting metal particles in an air-dry binder material adhered directly to said thermoplastic material and a second layer comprised of a thin strip of an electrically conducting metal superimposed over said first layer, and a plurality of spaced wires extending between said electrodes, said wires being at least partially embedded in said thermoplastic material with the ends of each of said wires being disposed between said first and second electrode layers and in electrical contact therewith.

2. A heated glazing as defined in claim 1, wherein said thermoplastic material is polyvinyl butyral resin.

3. A heated glazing as defined in claim 1, wherein said suspension comprises particles of metallic silver dispersed in a resinous binder.

4. A heated glazing as defined in claim 1, wherein said strip of electrically conducting metal of one electrode overlaps said air-dried suspension layer thereof in the direction of the other of said electrodes.

5. A heated glazing as defined in claim 1, wherein said strip of electrically conducting metal is composed of copper.

6. A heated glazing as defined in claim 1, wherein said wires are composed of tungsten.

7. A heated glazing as defined in claim 1, wherein said glass sheets are curved.

8. In a method of producing a heated laminated glazing unit including a pair of glass sheets bonded upon opposite sides of an interlayer composed of a thermoplastic material, the steps comprising applying to spaced portions of said thermoplastic material bands of an electrode material comprising a suspension of finely divided electrically conducting metal particles in an air-drying binder material, drying said suspension, applying a grid work comprised of a plurality of spaced, parallel extending wires upon said thermoplastic material with the ends of said wires extending over said dried electrode material, superimposing a strip of an electrically conductive metal over each of said bands of dried electrode material, applying heat to said electrically conducting metal strips to tack said strips to said bands, applying heat to at least a portion of said wires intermediate said electrodes to tack said wires to said sheet of thermoplastic material, positioning said sheet of thermoplastic material and attached wire grid work upon a first glass sheet, locating a second glass sheet on the opposite side of said thermoplastic interlayer from said first glass sheet, and laminating the assembly thus formed under the action of heat and pressure sufficient to bond the glass and plastic into a composite unit.

9. A method of producing a heated laminated glazing unit as defined in claim 8, wherein a thin coating of polyvinyl butyral is provided on the surface of each of said electrically conducting metal strips opposite that in contact with the wires prior to locating said second glass sheet on the thermoplastic interlayer.

10. A method of producing a heated laminated glazing unit as defined in claim 8, wherein an amount of pressure is applied to said portions of the wires intermediate the electrodes simultaneously with the heating thereof to both tack and partially embed the wires in the sheet of thermoplastic material.

11. In a method of producing a heated laminated glazing unit including a pair of glass sheets bonded upon opposite sides of an interlayer composed of a thermoplastic material, the steps comprising applying to spaced portions of a first sheet of thermoplastic material bands of an electrode material comprising a suspension of finely divided electrically conducting metal particles in an air-drying binder material, drying said suspension, applying a grid work comprised of a plurality of spaced, parallel extending wires upon said first sheet of thermoplastic material with the ends of said wires extending over said dried electrode material, superimposing a strip of an electrically conductive metal substantially co-extensive in dimensions with said bands of dried electrode material over each of said electrode bands, applying heat to said electrically conducting metal strips to tack said strips to said bands, applying heat to at least a portion of said wires intermediate said electrodes to tack said wires to said first sheet of thermoplastic material, positioning said first sheet of thermoplastic material and attached wire grid work upon a first glass sheet wire grid side up, positioning a second sheet of thermoplastic material over said first sheet and wire grid work, locating a second glass sheet on top of said second sheet of thermoplastic material, and laminating the assembly thus formed under the action of heat and pressure sufficient to bond the glass and plastic into a composite unit.

12. In an automotive vehicle, the combination including a window comprising inner and outer sheets of glass integrally bonded together through an interposed layer of thermoplastic material, a plurality of spaced wires retained at the interface between one of said glass sheets and said layer of thermoplastic material and of small diameter so as to be substantially invisible under normal conditions, spaced bus bars intermediate said one glass sheet and said layer of thermoplastic material in electrical contact with said wires, said bus bars comprising a first layer formed by the air-drying of a suspension of finely divided electrically conducting metal particles in an air-dry binder material adhered directly to said thermoplastic material and a second layer comprising a thin strip of an electrically conducting metal superimposed over said first layer, said wires extending between said first layer and said metal strip, a source of electric current, and an electrical conductor connecting said current source with said bus bars.

References Cited

UNITED STATES PATENTS 2,526,327 10/1950 Corlson _____ 219—203 X
3,223,829 12/1965 Davy et al. _____ 219—522
3,288,983 11/1966 Lear _____ 219—522

FOREIGN PATENTS 726,276 1/1966 Canada.

BERNARD A. GILHEANY, Primary Examiner.

VOLODYMYR Y. MAYEWSKY, Assistant Examiner.